United States Patent [19]

Samukawa et al.

[11] Patent Number: 5,582,234
[45] Date of Patent: Dec. 10, 1996

[54] AUTOMOTIVE AIR CONDITIONER

[75] Inventors: Katsuhiko Samukawa, Obu; Yuji Honda, Okazaki, both of Japan

[73] Assignee: Nippondenso Co., Ltd., Kariya, Japan

[21] Appl. No.: 530,579

[22] Filed: Sep. 19, 1995

[30] Foreign Application Priority Data

Sep. 20, 1994 [JP] Japan .................... 6-224844

[51] Int. Cl.$^6$ .................................. F25B 29/00
[52] U.S. Cl. .................. 165/204; 165/43; 62/244; 454/75; 236/493
[58] Field of Search ................ 165/28, 42, 43; 237/2 A, 12.3 A, 12.3 B; 454/75; 62/244; 236/49.3

[56] References Cited

U.S. PATENT DOCUMENTS

| | | | |
|---|---|---|---|
| 4,460,036 | 7/1984 | Yoshimi et al. | 165/42 |
| 4,482,009 | 11/1984 | Nishimura et al. | 62/244 |
| 4,762,169 | 8/1988 | Andersen et al. | 165/43 |
| 5,086,628 | 2/1992 | Hahimoto | 62/244 |
| 5,325,912 | 7/1994 | Hotta et al. | 165/43 |
| 5,337,802 | 8/1994 | Kajino et al. | 165/43 |
| 5,390,728 | 2/1995 | Ban | 165/43 |
| 5,392,845 | 2/1995 | Honda et al. | 165/43 |
| 5,452,587 | 9/1995 | Honda et al. | 236/49.3 |

FOREIGN PATENT DOCUMENTS

5-213050  8/1993  Japan .

*Primary Examiner*—William E. Tapolcai
*Attorney, Agent, or Firm*—Cushman, Darby & Cushman IP Group of Pillsbury Madison & Sutro LLP

[57] ABSTRACT

A base mode is set at a face mode or foot mode based on an external air temperature signal TAM detected by an external air temperature sensor. An automotive air conditioner includes a driver side air conditioning zone and a passenger side air conditioning zone. When the blow mode for the driver side air conditioning zone is set in the foot mode and the blow mode for the passenger side air conditioning zone is set in the face mode or vice versa, the blow mode which is identical to the base mode is maintained. The other blow mode is changed to a bilevel mode. This prevents frequent change in the base mode and avoids hunting.

12 Claims, 6 Drawing Sheets

FIG. 9 ic Air Conditioner

AUTOMOTIVE AIR CONDITIONER

CROSS REFERENCE TO RELATED APPLICATIONS

This application is based on and claims priority of Japanese Patent application No. 6-224844 filed Sep. 20, 1994, the contents of which are incorporated herein by reference.

BACKGROUND OF THE INVENTION

1. Field of the Invention

The present invention relates to an automotive air conditioner, more particularly relates to an automotive air conditioner having parallel air conditioning zones designed to reduce interference between the air conditioning zones to obtain a comfortable environment.

2. Description of the Related Art

A conventional automotive air conditioner is disclosed, for example, in Japanese Patent Application Laid-Open No. 5-213050.

The automotive air conditioner includes passenger's seat side air conditioning zone and driver's seat side air conditioning zone. When blow mode (air blowing mode) of the air conditioner is different in the driver's side and passenger's side (right and left side), for example, face mode in the right side and foot mode in the left side, or vice versa, the automotive air conditioner performs correction control of blow modes to adjust or change blow modes to avoid temperature interference between driver's side and passenger's side as described in the following paragraphs.

The correction control of blow modes performs first calculation of the right and left side target blow temperatures TAOr and TAOl based on a set desired temperature, the external air temperature and other related parameters. The right and left side target blow temperatures TAOr and TAOl are given by the following formulae (1) and (2). Then, the right and left blow modes are determined based on the target blow temperatures TAOr and TAOl and set.

$$TAOr = Kset \cdot Tsetr - KR \cdot TR - KAM \cdot TAM - Ks \cdot Ts + C \quad (1)$$

$$TAOl = Kset \cdot Tsetl - Kr \cdot tr - KAM \cdot TAM - Ks \cdot Ts + C \quad (2)$$

where Tsetl is a set temperature in the driver's seat, Tsetr is a set temperature in the passenger's seat, TR is internal air temperature, TAM is external air temperature, Ts is the intensity of solar radiation, Kset is a set temperature gain, KR is an internal air temperature gain, KAM is an external air temperature gain, Ks is a solar radiation intensity gain, and C is a correction constant.

Figure 9:
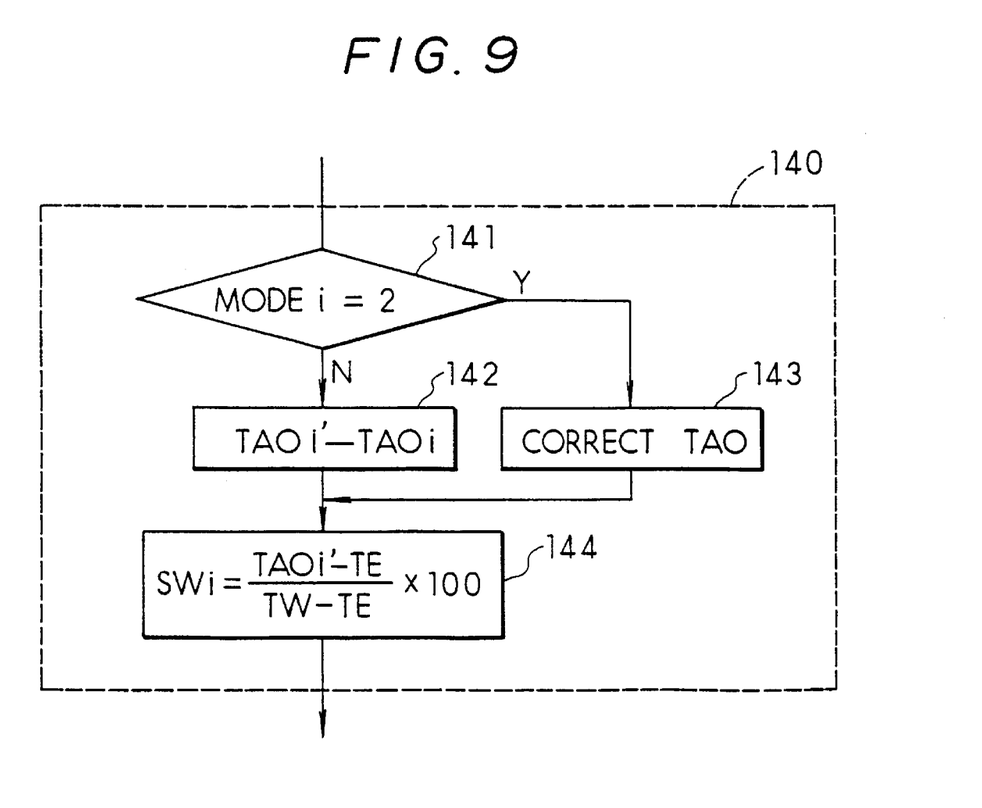
FIG. 9 is a flow chart showing the correction control steps in step 140 in blow mode.

When blow modes are respectively set as face mode and foot mode in the right and left side seats, or vice versa, the blow modes which is identical to a base mode B (MODE B) is maintained. The other blow mode is changed to a bilevel mode. The blow mode as maintained is determined based on the mean value between the right and left target blow temperatures TAOr and TAOl as shown in FIG. 9 in Japanese Patent Application Laid-Open No. 5-213050.

However, this adjustment presents the following problems since the mean value between the target blow temperatures TAOr and TAOl is used to determine the base mode B as described earlier.

The target blow temperatures TAOr and TAOl to determine the base mode B are given by the formulae (1) and (2), but these formulae include the internal air temperature, the solar radiation intensity and other parameters which are subject to substantial change. Accordingly, the base mode B is easy to change in each control cycle.

For example, the blow mode for the driver's seat is selected as face mode, whereas the blow mode for the passenger's seat is selected as foot mode. If the base mode B is determined as face mode based on the target blow temperatures TAOr and TAOl, then the blow mode for the passenger's seat is changed from the foot mode to a bilevel mode.

If the base mode B is thereafter changed to foot mode, then the blow mode for the driver's seat is changed from the face mode to bilevel mode, whereas the blow mode for the passenger's seat is returned to the foot mode. This results in hunting. Frequent change in blow mode may make the occupants in the vehicle feel uncomfortable.

SUMMARY OF THE INVENTION

In view of the foregoing, it is an object of the present invention to provide an automotive air conditioner which prevents temperature interference between right and left air conditioning zones and eliminates the occurrence of hunting.

In one preferred mode of an automotive air conditioner in the present invention, an air conditioner independently controls temperature of air blown to a driver seat side and a passenger seat side and airconditions two air conditioning zones for driver side and passenger side. Each air conditioning zone is controlled into three blow modes, a foot mode for directing the air toward a lower half of an occupant of a vehicle, a face mode for directing the air toward an upper half of the occupant of the vehicle, and a bilevel mode for directing the air toward the upper and lower halves of the occupant of the vehicle. The automotive air conditioner includes temperature setting means, physical value detecting means, base mode setting means, blow mode selection means, blow mode changing means, air condition control means. The temperature setting means sets first and second temperatures corresponding to the two air conditioning zones. The physical value detecting means detects a physical value corresponding to an external air temperature outside the vehicle. The base mode setting means sets the face mode or the foot mode as a base mode based on the physical value detected by the physical value detecting means; blow mode selection means for selecting said blow mode in each of the air conditioning zones based on a selected temperature selected by the temperature setting means and thermal physical values within and inside the vehicle. The blow mode changing means whereby when the blow mode for one of the air conditioning zones is selected as the foot mode and the blow mode for the other air conditioning zone is selected as the face mode. The blow mode changing means maintains one of the selected blow modes which is identical to the base mode determined by the base mode setting means and changes the other selected mode to the bilevel mode. Air conditioner control means performs air condition based on the blow mode maintained or changed by the blow mode changing means, so that the blow mode for the one air conditioning zone is maintained, and the blow mode for the other air conditioning zone is changed to the bilevel mode.

Preferably, the base mode setting means is arranged to select the face mode as the base mode when the physical value detected by the physical value detecting means is high and the foot mode when low.

Preferably, the automotive air conditioner further includes internal air temperature detecting means for detecting temperature of internal air within the vehicle and target blow temperature calculation means for calculating target blow temperatures for the two air conditioning zones based on the internal air temperature detected by the internal air temperature detecting means and the first selected temperature, and based on the internal temperature and the second selected temperature.

Preferably, the automotive air conditioner further includes target blow temperature correcting means for reducing the target blow temperature for one of the air conditioning zones of which blow mode is changed to the bilevel mode when the base mode selected by the base mode setting means is the face mode, and increasing the target blow temperature for one of the air conditioning zones of which blow mode is changed to the bilevel mode when the base mode selected by the base mode setting means is the foot mode.

In operation, the base mode setting means selects the face or foot mode as the base mode based on a physical value corresponding to the temperature of an air outside of the vehicle. The blow mode selection means selects the foot mode for one of the air conditioning zones and the face mode for the other air conditioning zones. The blow mode changing means is then operable to maintain one of the blow modes which is identical to that as selected by the base mode setting means and change the other blow mode to a bilevel mode.

Again, the base mode setting means uses the physical value corresponding to the temperature of the external air temperature to determine the base mode. Thus, no frequent change to the base mode occurs within a short period of time. Also, the blow mode in each of the air conditioning lines is free from frequent change to avoid hunting and to prevent the occupants of the vehicle from feeling uncomfortable.

DESCRIPTION OF THE PREFERRED EMBODIMENTS

First embodiment of the present invention will now be described with reference to the accompanying drawings.

Figure 1:
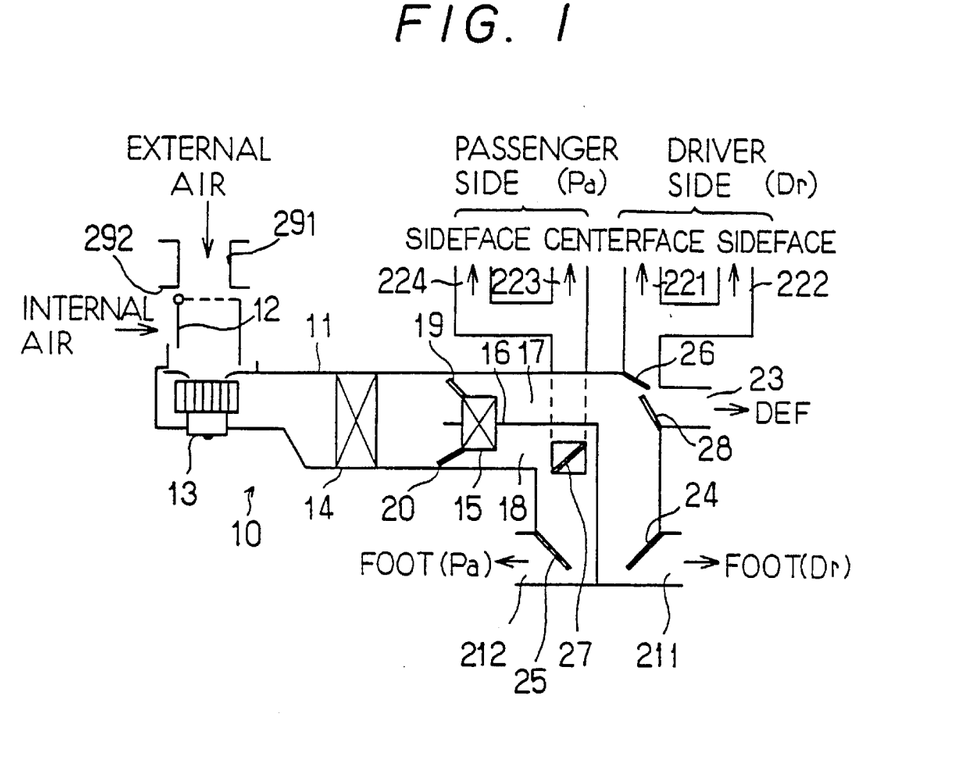
FIG. 1 is an overall view of an automotive air conditioner according to first embodiment of the present invention.
Figure 2:
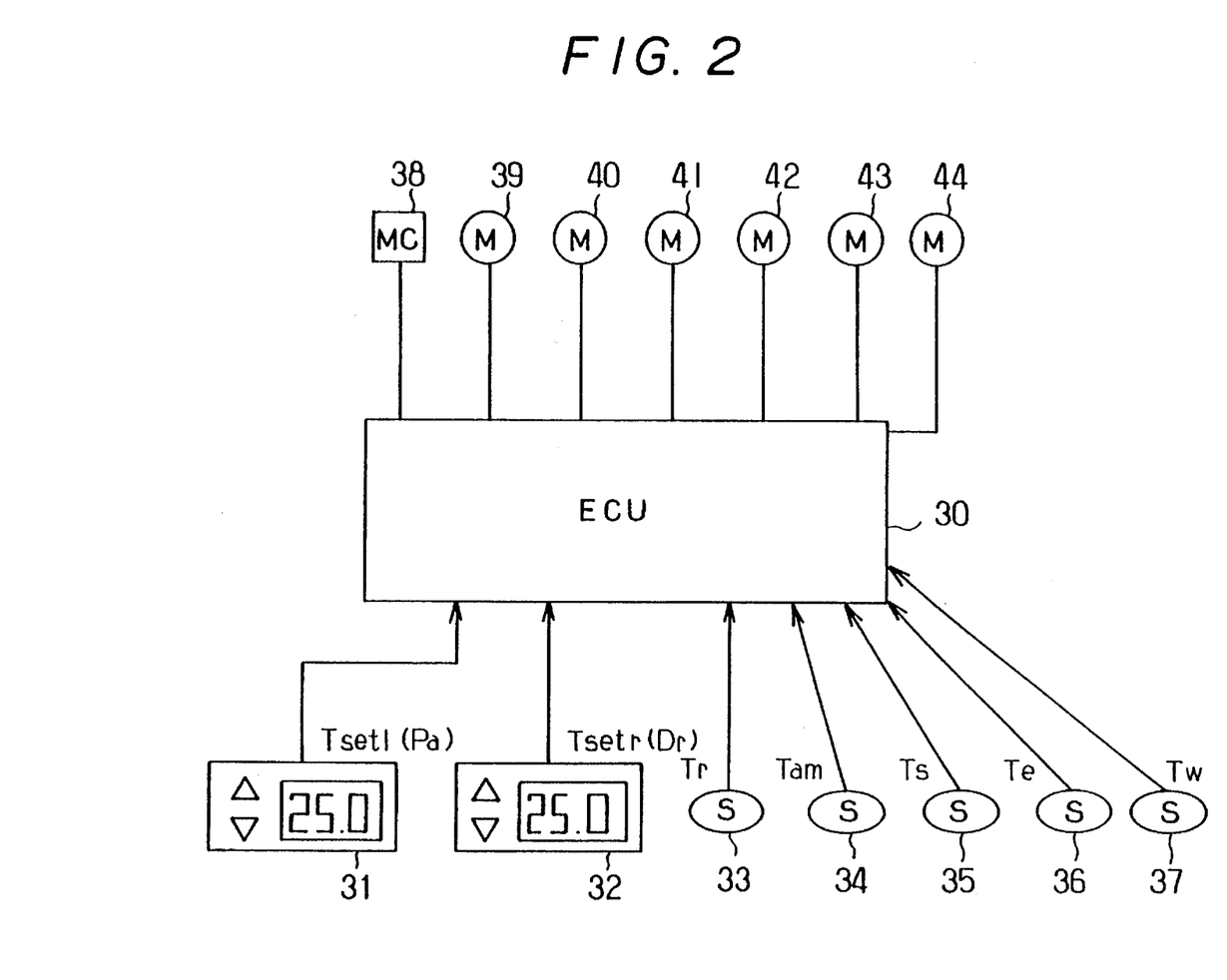
FIG. 2 is a schematic view of a control system for the air conditioner shown in FIG. 1.

FIG. 1 schematically shows an automotive air conditioner for independently controlling the temperatures in the driver and passenger sides. FIG. 2 schematically shows a control system for the air conditioner.

As shown in FIG. 1, an air conditioner 10 includes an air duct 11 installed in a vehicle. An internal/external air changing damper 12, a blower 13, an evaporator 14, and a heater core 15 are located within the air duct 11 and arranged in this order from its upstream to downstream. A portion of the air duct 11 downstream of the heater core 15 is divided into a driver side air passage 17 and a passenger side air passage 18 by a partition 16.

The internal/external air changing damper 12 allows fresh or external air to flow into the air duct 11 through an external air inlet 291, allows internal air to flow into the air duct 11 through an internal air inlet 292, or allows both external and internal air to flow into the air duct 11 through the respective inlets 291 and 292. The blower 13 directs the flow of external and/or internal air to the evaporator 14.

The evaporator 14 cools the air blown from the blower 13 by circulating refrigerant in a cooling system (not shown). The heater core 15 to receive an engine coolant heats an air flow once cooled in the evaporator 14.

The heater core 15 has a driver side air mixing damper 19 and a passenger side air mixing damper 20 for adjusting the temperature of the air by changing an air mixing ratio. Formed in the air duct downstream of the driver side passage 17 and the passenger side passage 18 are foot air outlets 211 and 212 for directing the air toward the lower bodies (feet) of the vehicle occupants, center and side face air outlets 221, 222, 223 and 224 for directing the air toward the upper bodies (faces and/or breasts) of vehicle occupants, and a defroster outlet 23 for directing the air toward the upper part (including a front glass) of the vehicle compartment. Outlet changing dampers 24, 25, 26, 27 and 28 are arranged at the respective outlets.

In addition to the above explanation, foot mode means a mode blowing the air toward the feet from the foot outlet 211 or 212. Face mode means a mode blowing the air toward the upper body of the occupant from the center outlet 221 or 223 and the side face outlet 222 or 224. Bilevel(B/L) mode means a mode blowing the air toward the upper body of the occupant and the lower body of the occupant simultaneously from the center outlet 221 or 223 and the side face outlet 222 or 224 and the foot outlet 211 or 212.

Referring to FIG. 2, the control system includes an electronic control unit (ECU) 30 connected to a driver side temperature selector 31, a passenger side temperature selector 32, an internal air temperature sensor 33 for detecting the temperature of air within the vehicle, an external air temperature sensor 34 for detecting the temperature of external air, a solar radiation sensor 35 for measuring the intensity of solar radiation, a post-evaporator temperature sensor 36 for measuring the temperature of the air immediately after it passes through the evaporator 14, and a coolant temperature sensor 37 for measuring the temperature of the engine coolant. The temperature selectors 31 and 32 jointly works as a temperature setting means. The internal air temperature sensor 33 works as a physical value detecting means as well as an internal air temperature detecting means.

The ECU 30 receives input signals from these sensors and sends drive signals to a motor controller 38 for driving the blower 13, servomotors 39 and 40 for driving the air mixing dampers 19 and 20, a servomotor 41 for driving the internal/external air changing damper 12, a servomotor 42 for driving the outlet changing dampers 25 and 27 for the passenger side, a servomotor 43 for driving the outlet changing dampers 24 and 26 for the driver seat, and a servomotor 44 for driving the defroster outlet damper 28.

The ECU 30 is rendered operative upon receipt of electrical power from an ignition switch (not shown). A program stored in the ECU 30 is executed when an air conditioner switch is switched on.

Figure 3:
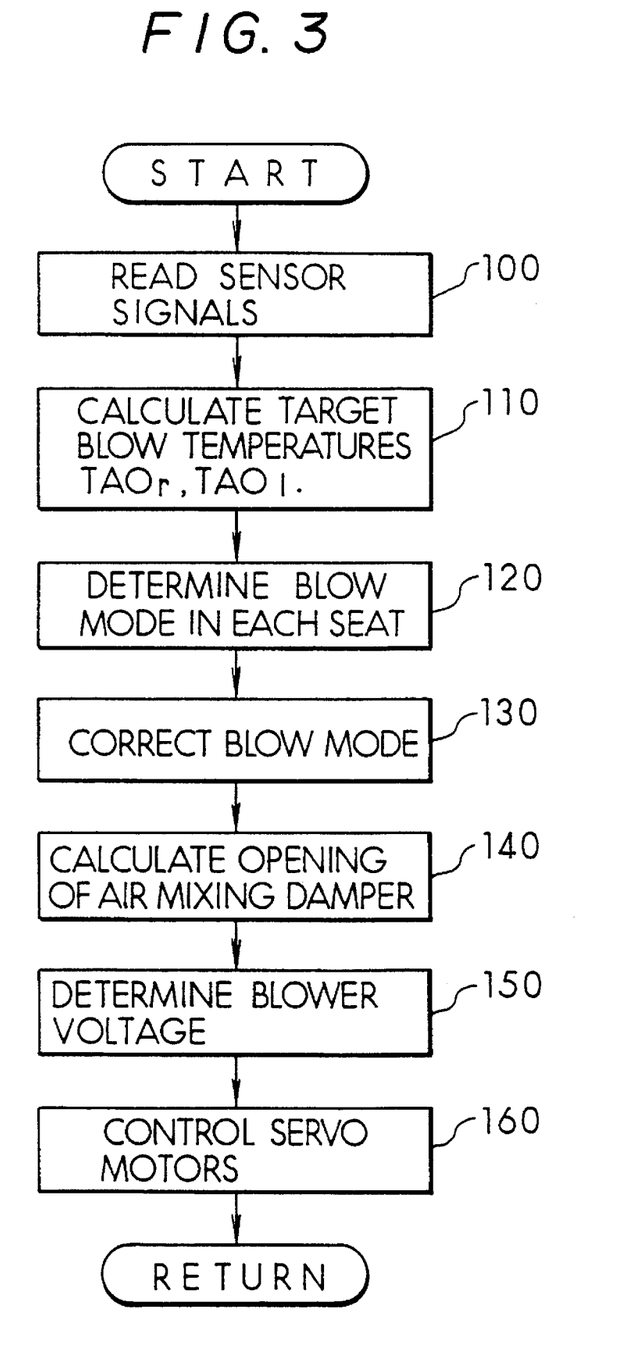
FIG. 3 is a flow chart showing the control of the air conditioner of the first embodiment.

FIG. 3 is a flow chart showing the control of the ECU 30.

In step 100, the ECU 30 receives and stores selected temperature signals Tsetl and Tsetr from the driver side temperature selector 31 and the passenger side temperature selector 32 respectively, an internal air temperature signal TR from the internal air temperature sensor 33, an external air temperature signal TAM from the external air temperature sensor 34, a solar radiation intensity signal Ts from the solar radiation sensor 35, a post-evaporator temperature signal Te from the post-evaporator temperature sensor 36, and a coolant temperature signal Tw from the coolant temperature sensor 37.

In step 110, target blow temperatures TAOl and TAOr are given by the following formulae (1) and (2).

$$TAOl = Kset \cdot Tsetl - Kr \cdot tr - KAM \cdot TAM - Ks \cdot Ts + C \quad (1)$$

$$TAOr = Kset \cdot Tsetr - Kr \cdot tr - KAM \cdot TAM - Ks \cdot Ts + C \quad (2)$$

where Kset, KR, KAM and Ks are a selected temperature gain, an internal temperature gain, an external temperature gain, and a solar radiation intensity gain, respectively. C is a correction constant.

Step 110 forms a target blow temperature calculation means.

Figure 4:
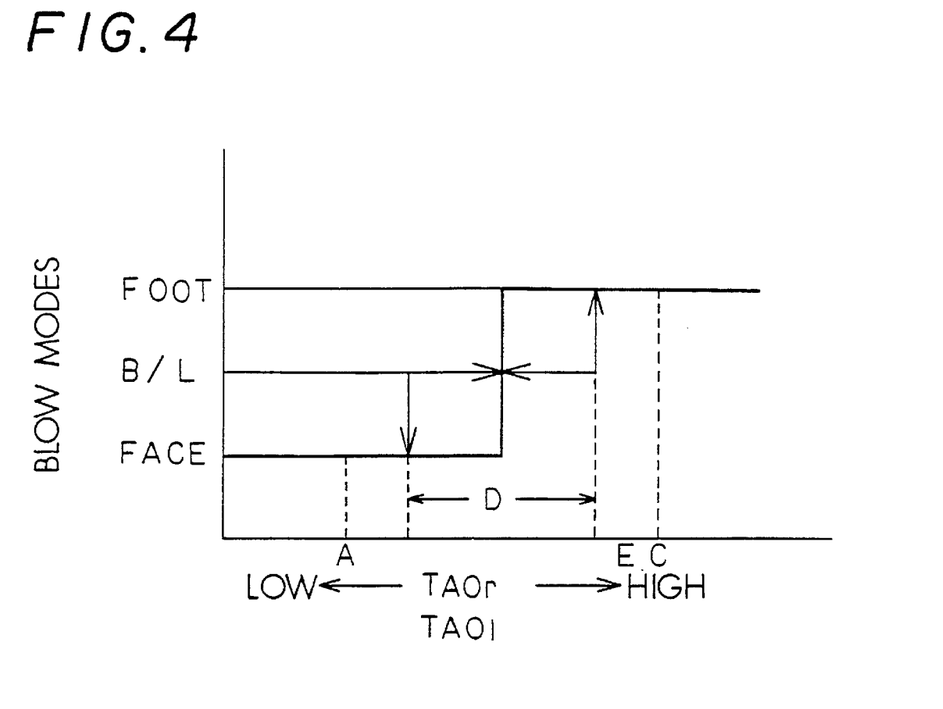
FIG. 4 is a graph showing the relationship between target blow temperatures TAOr and TAOl and blow modes.
Figure 5:
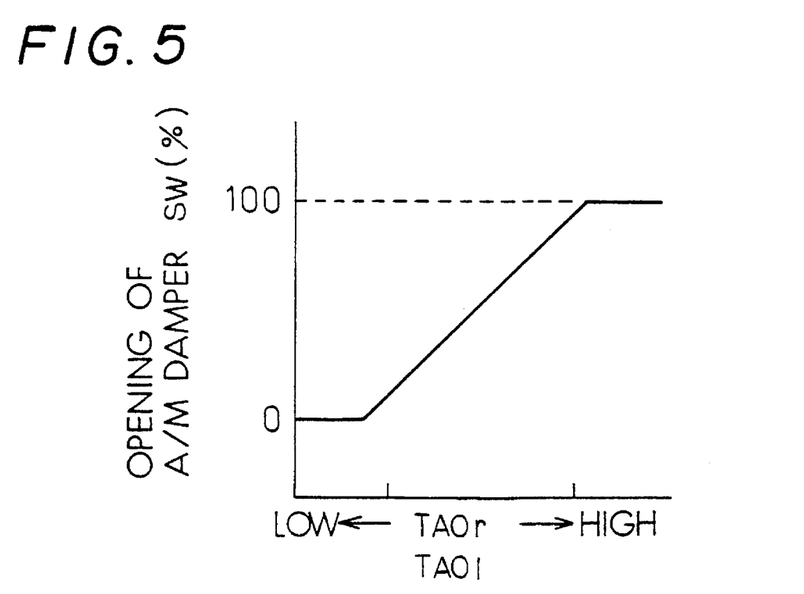
FIG. 5 is a graph showing the relationship between target blow temperatures TAOr and TAOl and the opening degree of the air mixing dampers.

In step 120, a desired blow mode is selected based on the target blow temperatures TAOl and TAOr stored in step 110 based on the relationship in FIG. 4. Step 120 forms a blow mode selection means.

Step 130 is then to determine whether the blow mode requires correction. Correction, if necessary, is made to change the blow modes, which will later be explained in detail.

In step 140, the engine coolant temperature signal Tw stored in step 100, the post-evaporator temperature signal Te, and the target blow temperatures TAOr and TAOl obtained in step 110 are used to determine an opening SW of each of the driver side air mixing damper 19 and the passenger side air mixing damper 20 as indicated by the formula (3).

$$SW = \{(TAOi - Te)/(TW - Te)\} \times 100 \quad (3)$$

(i=l or r)

In step 140, the opening SW of the driver side air mixing damper 19 or the passenger side air mixing damper 20 is be adjusted based on the corrected target blow temperatures if the initial target value has been corrected in step 130. This correction will later be described in detail.

Figure 6:
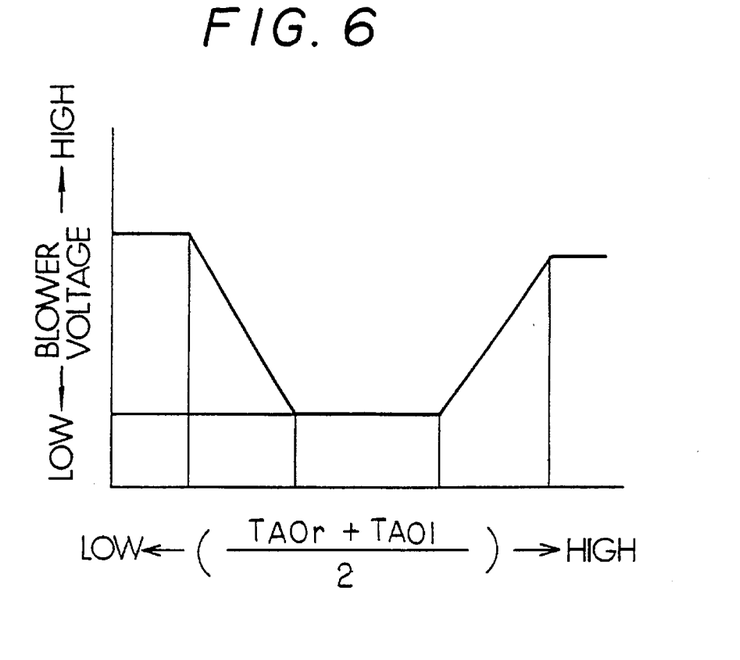
FIG. 6 is a graph showing the relationship of target blow temperatures TAOr and TAOl and blower voltage.

In step 150, the level of a blower voltage to be applied to the blower 13 is determined based on the target blow temperatures TAOr and TAOl based on step 110 or step 140, as shown in FIG. 6.

In step 160, the control signals generated in steps 100 through 150 are sent to each drive unit or motor. The flow chart is returned after step 160 has been completed, and a control cycle time τ has passed.

Figure 7:
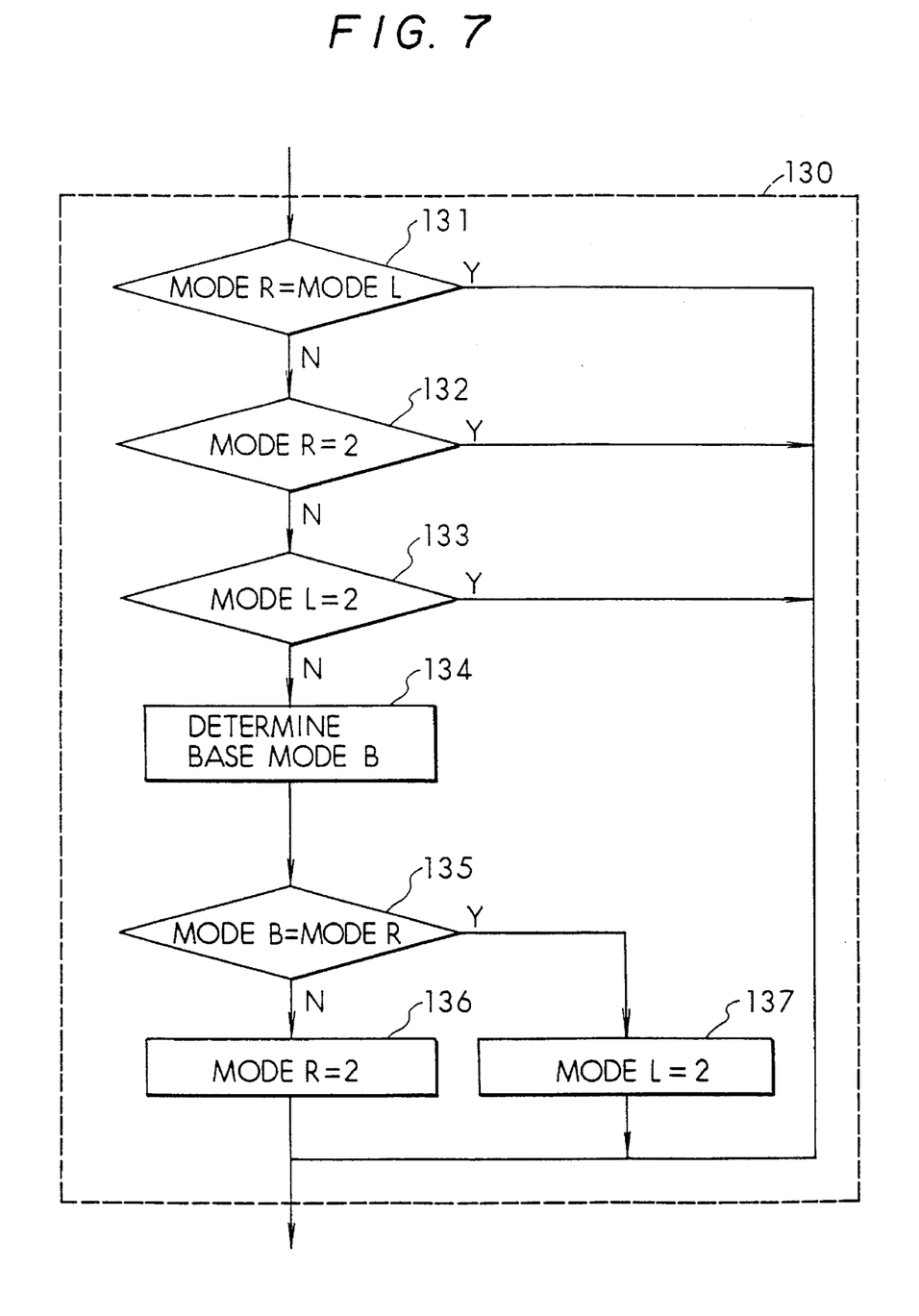
FIG. 7 is a flow chart showing the correction control steps in step 130 in blow mode.
Figure 8:
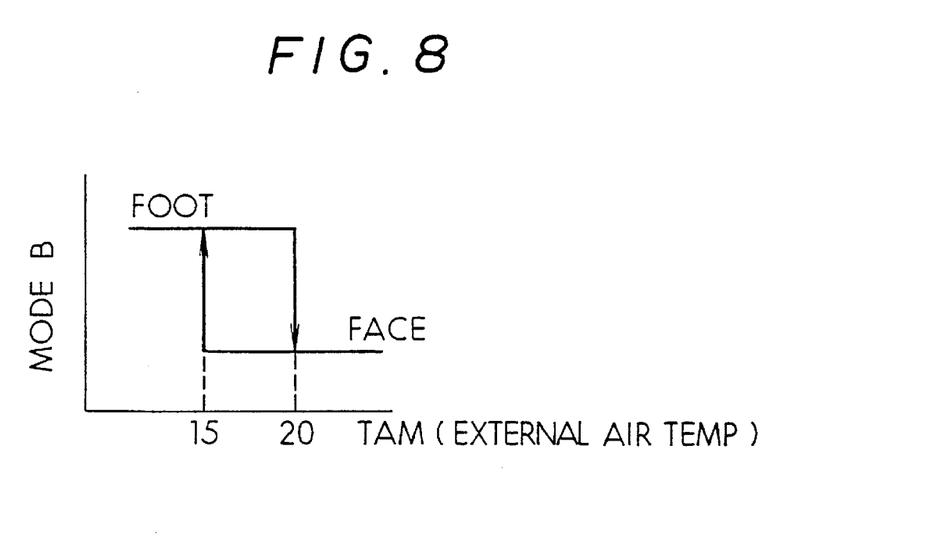
FIG. 8 is a graph showing the relationship of external air temperature TAM and the base mode B.

Correction control of the blow modes in step 130 is explained based on is a flow chart in FIG. 7 and a graph in FIG. 8. Correction control of target blow temperatures in step 140 is explained based on a graph in FIG. 9.

In FIG. 7, MODER represents a blow mode used for the driver side. MODEL represents a blow mode used for the passenger side. The numeral 2 indicates a bilevel mode. Step 130 is performed simultaneously when step 120 is completed.

First, step 131 is carried out to determine whether the blow mode (hereinafter, referred to as "first blow mode") for the driver side air passage 17 and the blow mode (hereinafter referred to as "second blow mode") for the passenger side air passage 18 are identical. If the first and second blow modes are equal, i.e., both face, foot or bilevel modes, no correction is necessary. That is, when the answer is NO, the program proceeds to step 132. If the answer is YES, then the program proceeds to step 140.

Step 132 determines whether or not the first blow mode is a bilevel mode. If the answer is YES, the program proceeds to step 140. If, on the other hand, the answer is NO, the program proceeds to step 133.

Step 133 determines whether or not the second blow mode is a bilevel mode. If the answer is YES, then the program proceeds to step 140. If, on the other hand, the answer is NO, then the program proceeds to step 134.

Step 131 to step 133 are used to determine whether or not the first blow mode and the second blow mode are opposite in mode, for example, the first blow mode is a foot mode and the second blow mode is a face mode or vice versa.

In step 134, a base mode B (MODE B) is determined or selected based on FIG. 8.

Referring to FIG. 8, either a foot mode or face mode is selected as the base mode B based on the external air temperature signal TAM.

Since the external air temperature signal TAM does not change in a short period of time, the base mode B will in no way be changed from the face mode to the foot mode or vice versa in each control cycle. The face mode is selected when the external air temperature TAM is high. The foot mode is selected when the external air temperature TAM is low. For example, in step 120, the face mode is selected for the driver side and the foot mode is selected for the passenger side. If the external air temperature is high, the face mode in the driver side is maintained, but the foot mode in the passenger side is changed to a bilevel mode.

The air conditioner is operable to reduce the temperature of air within the vehicle and give the occupants an cool air when the external air temperature is high. Generally, an occupant feels cooler when cool air is directed to the upper body than to the lower body. By the same token, the occupant feels warmer when warm air is directed to the lower body. A blow mode is corrected in a manner to make the occupant feel comfortable. That is, a face mode is selected as the base mode B when the external air temperature is high. Conversely, a foot mode is selected as the base mode B when the external air temperature is low.

The following problems will also be solved by setting the base mode B based on the external air temperature signal TAM.

A problem of the air conditioner in the related art is that when setting temperature in the compartment is changed by a passenger, the blow mode in the driver's side is then changed to a bilevel mode. This makes the driver uncomfortable. Assuming that initially, the driver is the only occupant of the vehicle, and both the first and second blow modes are in foot mode, when a passenger gets into the vehicle and feels hot, he changes the setting temperature of air within the vehicle. If this occurs, the first blow mode is changed from the foot mode to a bilevel mode. This makes the driver uncomfortable. By the same token, if a passenger, regardless of whether or not he is the initial occupant, changes the set temperature in blow mode without reason, the first blow mode changes undesirably.

According to the present invention, the base mode B is set to be the face mode when the external air temperature is high, and to be the foot mode when the external air temperature is low. That is, the base mode B is so selected as to fit the occupants' temperature feeling. If an occupant changes blow modes, only the blow mode for the occupant who changed the blow mode changes the blow mode and the blow mode for the other occupant remains unchanged to prevent the occupant from feeling uncomfortable.

Step 134 forms a base mode setting means.

Step 135 determines whether the base mode B as selected in step 134 is identical to the first blow mode or the second blow mode. If YES, the program proceeds to step 137. In step 137, the blow mode for the passenger's side is changed to a bilevel mode. Thereafter, the program proceeds to step 140. If in step 135, the result is NO, the program proceeds to step 136. The blow mode for the driver side is changed to a bilevel mode. Thereafter, the program proceeds to step 140.

Step 130 forms a blow mode changing means.

When the blow mode is changed in step 130, the opening SW of the driver side air mixing damper 19 or the passenger side air mixing damper 20 is determined, in step 140, by inserting corrected target blow temperatures TAOl and TAOr into the formula (3).

Either the first or second blow mode is changed to a bilevel mode in order to prevent the first and second blow modes from being changed to face and foot modes, respectively, or vice versa. However, the target blow temperature per se remains unchanged, therefore, an occupant may feel uncomfortable.

For example, the driver side is set in face mode, and the passenger side is set in foot mode. Generally, cool air is provided in the face mode when the air conditioner is automatically controlled. As such, if the face mode is changed to a bilevel mode, cool air is also directed toward the feet of the driver. This makes the driver uncomfortable.

In order to avoid this problem, step 140 is carried out to effect correction based on a flow chart shown in FIG. 9. In FIG. 9, i designates either the driver seat r or the passenger seat l.

Step 141 determines whether or not the blow mode is corrected. If the result is YES, the program proceeds to step 143. If, on the other hand, the result is NO, the program proceeds to step 142.

In step 143, the target blow temperature TAOl or the target blow temperature TAOr as obtained in step 110 is corrected. For example, with the base mode B is set in face mode, the blow mode for the driver side is maintained in the face mode, and the blow mode for the passenger side is changed to a bilevel mode.

Now, the target blow temperature TAOl for the driver side is A, and the target blow temperature TAOr for the passenger side TAOr is C as shown in FIG. 4.

When the target blow temperature TAOr is C, the blow mode of the passenger side is the foot mode. Therefore, air having the target blow temperature TAOr (=C) feels the passenger warm. If the target blow temperature TAOr is left as it is, the warm air is directed toward the passenger through the face air outlet. To prevent this situation, the target blow temperature TAOr is corrected to lower the target blow temperature to be TAOr'.

At this time, the target blow temperature TAOr is lowered to be within a range indicated by the arrow D in FIG. 4.

If the target blow temperature TAOr is reduced simply to the value E as shown in FIG. 4, the opening SW of the passenger side air mixing damper 20 is determined based on the value E of the target blow temperature which is in the range of the foot mode. Therefore, if air is blown through the face outlet, the passenger may feel uncomfortable. To this end, the target blow temperature TAOr is reduced to fall within the range D as TAOr' in FIG. 4 so as not to make the passenger feel uncomfortable.

when the base mode B is foot mode, the first blow mode is changed to a bilevel mode. Similarly, the target blow temperature TAOl is adjusted to change within the range D in FIG. 4.

In step 144, the target blow temperature TAOl and the target blow temperature TAOr' or the target blow temperature TAOl' and the target blow temperature TAOr obtained in the previous step are inserted into the formula (3) to determine the position SW of the driver's seat air mixing damper 19 and the passenger seat air mixing damper 20. Thereafter, the program proceeds to step 160.

Step 140 forms a target blow temperature adjustment means. Also, each of the foregoing steps forms a means for performing each specific function.

As described above, the base mode B is determined based on external air temperature to prevent frequent change in a short period of time and to avoid hunting of the blow mode selector damper.

Even if a substantial change in selected temperature occurs, the blow mode is changed to a bilevel mode, so that the occupant in the other air conditioning zone does not feel uncomfortable.

The base mode B is set in face mode when the external air temperature is high, and it is set in foot mode when the external air temperature is low. This controls the temperature of air to meet the needs of the occupants and provides a comfortable environment.

When the blow mode is changed to a bilevel mode, the target blow temperature thereof is corrected to an appropriate level, so that the air conditioner can change the blow mode into the bilevel mode without making the occupant feel uncomfortable.

In the foregoing embodiment, the target blow temperature is corrected once. Alternatively, it may gradually be corrected by using a time constant or any other technique.

In the foregoing embodiment, the base mode B is determined based on the external air temperature TAM. Alternatively, it may be determined based on the initial temperature of the engine coolant when the ignition switch is on. That is, when the initial temperature is low, the external air temperature is also taken as low. The base mode B is thus set in foot mode. On the other hand, if the initial temperature is high, the external air temperature is also taken as high. The base mode B is thus set in face mode.

What is claimed is:

1. An automotive air conditioner independently controlling temperature of air blown to a driver seat side and a passenger seat side in response to first and second selected temperatures selected through temperature selectors mounted in a vehicle and airconditioning two air conditioning zones for driver side and passenger side, each air conditioning zone being controlled into three blow modes, a foot mode for directing the air toward a lower half of an occupant of a vehicle, a face mode for directing the air toward an upper half of the occupant of the vehicle, and a bilevel mode for directing the air toward the upper and lower halves of the occupant of the vehicle, said automotive air conditioner comprising:

physical value detecting means for detecting a physical value corresponding to an external air temperature outside the vehicle;

base mode setting means for setting the face mode or the foot mode as a base mode based on said physical value detected by said physical value detecting means;

blow mode selection means for selecting said base mode selected by said base mode setting means for one of said air conditioning zone and the bilevel mode for the other air conditioning zone when there is a large difference between said first and second selected temperatures; and blow mode control means for controlling said blow modes in said air conditioning zones to be identical to said blow modes selected by said blow mode selection means.

2. An automotive air conditioner according to claim 1, wherein said base mode setting means is arranged to select the face mode as said base mode when said physical value detected by said physical value detecting means is high and the foot mode when low.

3. An automotive air conditioner according to claim 2, further comprising:

internal air temperature detecting means for detecting temperature of internal air within the vehicle; and target blow temperature calculation means for calculating target blow temperatures for said two air conditioning zones based on said internal air temperature detected by said internal air temperature detecting means and said first selected temperature, and based on said internal temperature and said second selected temperature.

4. An automotive air conditioner according to claim 3, further comprising target blow temperature correcting means for reducing said target blow temperature for one of said air conditioning zones of which blow mode is changed to the bilevel mode when said base mode selected by said base mode setting means is the face mode, and increasing said target blow temperature for one of said air conditioning zones of which blow mode is changed to the bilevel mode when said base mode selected by said base mode setting means is the foot mode.

5. An automotive air conditioner according to claim 4, wherein said blow mode selection means selects said blow mode for each of said air conditioning zones in response to said target blow temperature, and includes a first zone wherein the face mode is selected when said target blow temperature is low and a second zone wherein the bilevel mode is selected when said target blow temperature is higher than that of the first zone, and a third zone wherein the foot mode is selected when said target temperature is higher than that of the second zone.

6. An automotive air conditioner according to claim 5, wherein said target blow temperature correcting means corrects said target blow temperature for one of the air conditioning zones wherein the bilevel mode is selected to fall within said second zone.

7. An automotive air conditioner independently controlling temperature of air blown to a driver seat side and a passenger seat side and airconditioning two air conditioning zones for driver side and passenger side, each air conditioning zone being controlled into three blow modes, a foot mode for directing the air toward a lower half of an occupant of a vehicle, a face mode for directing the air toward an upper half of the occupant of the vehicle, and a bilevel mode for directing the air toward the upper and lower halves of the occupant of the vehicle, said automotive air conditioner comprising:

temperature setting means for setting first and second temperatures corresponding to said two air conditioning zones;

physical value detecting means for detecting a physical value corresponding to an external air temperature outside the vehicle;

base mode setting means for setting the face mode or the foot mode as a base mode based on said physical value detected by said physical value detecting means;

blow mode selection means for selecting said blow mode in each of said air conditioning zones based on a selected temperature selected by said temperature setting means and thermal physical values within and inside the vehicle;

blow mode changing means whereby when said blow mode for one of said air conditioning zones is selected as the foot mode, and said blow mode for the other air conditioning zone is selected as the face mode, for maintaining one of said selected blow modes which is identical to said base mode determined by said base mode setting means and changing the other selected mode to the bilevel mode; and air conditioner control means for performing air condition based on said blow mode maintained or changed by said blow mode changing means, so that said blow mode for said one air conditioning zone is maintained, and the blow mode for the other air conditioning zone is changed to the bilevel mode.

8. An automotive air conditioner according to claim 7, wherein said base mode setting means is arranged to select the face mode as said base mode when said physical value detected by said physical value detecting means is high and the foot mode when low.

9. An automotive air conditioner according to of claim 8, further comprising:

internal air temperature detecting means for detecting temperature of internal air within the vehicle; and target blow temperature calculation means for calculating target blow temperatures for said two air conditioning zones based on said internal air temperature detected by said internal air temperature detecting means and said first selected temperature, and based on said internal temperature and said second selected temperature.

10. An automotive air conditioner according to claim 9, further comprising target blow temperature correcting means for reducing said target blow temperature for one of said air conditioning zones of which blow mode is changed to the bilevel mode when said base mode selected by said base mode setting means is the face mode, and increasing said target blow temperature for one of said air conditioning zones of which blow mode is changed to the bilevel mode when said base mode selected by said base mode setting means is the foot mode.

11. An automotive air conditioner according to claim 10, wherein said blow mode selection means selects said blow mode for each of said air conditioning zones in response to said target blow temperature, and includes a first zone wherein the face mode is selected when said target blow temperature is low and a second zone wherein the bilevel mode is selected when said target blow temperature is higher than that of the first zone, and a third zone wherein the foot mode is selected when said target temperature is higher than that of the second zone.

12. An automotive air conditioner according to claim 11, wherein said target blow temperature correcting means corrects said target blow temperature for one of the air conditioning zones wherein the bilevel mode is selected to fall within said second zone.

* * * * *